United States Patent [19]
Emert et al.

[11] Patent Number: 5,773,567
[45] Date of Patent: Jun. 30, 1998

[54] CARBOXYLIC AMIDE-CONTAINING POLYMERS FOR USE AS FUEL OR LUBRICATING OIL ADDITIVES AND PROCESSES FOR THEIR PREPARATION

[75] Inventors: Jacob Emert, Brooklyn, N.Y.; Richard H. Schlosberg, Bridgewater; David E. Gindelberger, Bedminster, both of N.J.; Roy L. Pruett, Harrisburg, N.C.

[73] Assignee: Exxon Chemical Patents Inc, Linden, N.J.

[21] Appl. No.: 663,465

[22] Filed: Jun. 17, 1996

[51] Int. Cl.$^6$ .................................................. C08G 67/02
[52] U.S. Cl. .................. 528/392; 525/419; 525/420; 508/551; 508/554
[58] Field of Search .................................. 508/551, 554; 528/220, 222, 225, 228, 229, 392; 525/420, 471, 419; 560/105

[56] References Cited

U.S. PATENT DOCUMENTS

| | | | |
|---|---|---|---|
| 3,172,892 | 3/1965 | Le Suer et al. | 260/326.5 |
| 3,215,707 | 11/1965 | Rense | 260/326.3 |
| 3,361,673 | 1/1968 | Stuart et al. | |
| 3,401,118 | 9/1968 | Benoit, Jr. | |
| 3,539,654 | 11/1970 | Pautrat et al. | 260/768 |
| 4,152,499 | 5/1979 | Boerzel et al. | 526/52.4 |
| 4,297,481 | 10/1981 | Jachimowicz | 528/392 |
| 4,312,965 | 1/1982 | Jachimowicz et al. | 525/378 |
| 4,317,932 | 3/1982 | Jachimowicz | 564/445 |
| 4,322,530 | 3/1982 | Jachimowicz | 544/403 |
| 4,605,808 | 8/1986 | Samson | 585/525 |
| 4,668,834 | 5/1987 | Rim et al. | 585/12 |
| 4,927,892 | 5/1990 | Drent et al. | 525/340 |
| 4,980,422 | 12/1990 | Willis | 525/370 |
| 5,322,633 | 6/1994 | Senaratne et al. | |

FOREIGN PATENT DOCUMENTS

| | | |
|---|---|---|
| 2110871 | 6/1994 | Canada . |
| 0106379 | 4/1984 | European Pat. Off. . |
| 0148592 | 7/1985 | European Pat. Off. . |
| 0208560 | 1/1987 | European Pat. Off. . |
| 0227160 | 7/1987 | European Pat. Off. . |
| 0382450 | 8/1990 | European Pat. Off. . |
| 389722 A1 | 10/1990 | European Pat. Off. . |
| 541176 A2 | 5/1993 | European Pat. Off. . |
| 975461 | 3/1951 | France . |
| 1440219 | 6/1976 | United Kingdom . |
| WO95/21904 | 8/1995 | WIPO . |
| WO95/24431 | 9/1995 | WIPO . |
| 95/35330 | 12/1995 | WIPO . |
| 9535328 | 12/1995 | WIPO . |
| WO95/35328 | 12/1995 | WIPO . |

OTHER PUBLICATIONS

"Carbonylations Catalyzed by Metal Carbonyls –Reppe Reactions" A. Mullen, Chapter 3 in New Syntheses with Carbon Monoxide, J. Falbe (editor), Springer–Verlag (1980).

"Progress in hydroformylation and carbonylation", M. Beller et al., J. Molecular Catalysis A, vol. 104, 1995, pp. 17–85.

*Primary Examiner*—Prince Willis, Jr.
*Assistant Examiner*—Cephia D. Toomer
*Attorney, Agent, or Firm*—K. R. Walton

[57] ABSTRACT

Processes for producing saturated polymers monosubstituted with carboxylic amides are disclosed. One process comprises reacting a monounsaturated hydrocarbon polymer with carbon monoxide and a polyamine containing at least two amino groups at least one of which is a reactive amino group, in the presence of a catalyst comprising at least one member selected from the group consisting of the transition metals of Group 8 to 10 and the metal compounds thereof. Another process comprises reacting a polyamine containing a reactive amino group with a monofunctionalized, saturated hydrocarbon polymer containing a carboxylic acid or carboxylic ester functional group, the monofunctionalized hydrocarbon polymer obtained by reacting a starting monounsaturated hydrocarbon polymer with carbon monoxide and water or alcohol in the presence of a Group 8–10 transition metal catalyst. The products of the processes are useful as additives in lubricating oils and in fuels, for example, as dispersants and/or detergents.

23 Claims, No Drawings

CARBOXYLIC AMIDE-CONTAINING POLYMERS FOR USE AS FUEL OR LUBRICATING OIL ADDITIVES AND PROCESSES FOR THEIR PREPARATION

FIELD OF THE INVENTION

This invention relates to saturated polymers monosubstituted with a carboxylic amide and processes for preparing them. The carboxylic amide-containing polymers are useful as additives (e.g., dispersants) in lubricating oils and in fuels.

BACKGROUND OF THE INVENTION

Ashless nitrogen-containing dispersant additives generally contain a long chain hydrocarbyl component chemically linked to a polar nitrogen-containing component. The long chain hydrocarbyl component is typically derived from a hydrocarbon polymer and the chemical link is typically a dicarboxylic acid, ester or anhydride group, incorporated into the hydrocarbon polymer by reacting the polymer with an unsaturated dicarboxylic compound. The dicarboxylic group is subsequently reacted with a polyamine to form the polar head group. In practice, the chemical link is most commonly a succinic group derived from maleic anhydride. These functionalized polymers (e.g., succinated polymers) have been prepared by reacting the hydrocarbon polymer, typically a conventional polyisobutene obtained from butene streams by cationic polymerization in the presence of an $AlCl_3$ catalyst, with an unsaturated dicarboxylic compound (e.g., maleic anhydride) at elevated temperature in the presence of chlorine. Exemplary processes are described in U.S. Pat. No. 3,215,707, EP-A-382450 and GB-A-1440219. The functionalized polymers have also been prepared by using a two-step chloro process in which the polymer is chlorinated in the first step and the resulting chlorinated polyalkene is then reacted with the unsaturated dicarboxylic compound at elevated temperature. Such a process is described in U.S. Pat. No. 3,172,892. The functionalized polymers have also been prepared by the direct thermal reaction of the hydrocarbon polymer and the unsaturated dicarboxylic compound, often referred to in the art as the thermal ene process. The thermal ene process is described in, for example, U.S. Pat. No. 3,361,673 and U.S. Pat. No. 3,401,118.

In the chloro and thermal ene processes, the dicarboxylic compound undergoes addition with the hydrocarbon polymer at an olefinic double bond site in the polymer, wherein the addition reaction results in the isomerization, but not the elimination, of the original double bond. This residual double bond content in the functionalized polymer can be problematic, because it will typically be present in the nitrogen-containing dispersant product derived therefrom, wherein it is a potential site for oxidation and degradation of the dispersant particularly in high temperature applications, such as use in a passenger car motor oil. The residual unsaturation can be saturated by hydrogenation, but this of course requires an additional processing step at additional cost.

The residual double bond content also provides a site for further addition of dicarboxylic compound during the functionalization reaction step which can result in a product containing polyfunctionalized (e.g., poly-succinated) polymer chains. Products consisting predominantly to substantially of monofunctionalized polymers are often preferred for use in the preparation of ashless dispersants in order to avoid or minimize adverse interaction of the dispersant with other additives employed in the lubricating oil or fuel. For example, dispersants based upon monofunctionalized polymer can have the advantage of minimizing adverse interactions (e.g., gelation) with overbased detergents, which interactions are described in EP-A-208560.

It can be difficult to control the chloro and thermal processes to produce monofunctionalized polymer in high yields. The more active chloro processes can produce functionalized product in high yields, but, without careful monitoring and control of reaction parameters, the product can contain significant to major amounts of polyfunctionalized polymer. The chloro processes raise environmental concerns as well, because their products contain residual amounts of chlorine. The thermal ene process avoids the use of chlorine and generally results in monofunctionalized product, but maleic anhydride reacts poorly and in low yields under thermal conditions with less reactive polymers such as conventional polyisobutene which has a low content of reactive vinylidene unsaturation and correspondingly large amounts of the less reactive tri- and tetra-substituted double bonds. The use of more extreme conditions in the thermal ene reaction to increase yields typically leads to the formation of substantial amounts of tar and sediments. If more reactive polymers are employed in the thermal ene reaction, such as reactive polyisobutenes as described in U.S. Pat. No. 4,152,499 and U.S. Pat. No. 4,605,808 and ethylene α-olefin polymers prepared using metallocene catalysts such as those described in U.S. Pat. No. 4,668,834, the reaction becomes more facile with higher yields, but the addition of a second enophile to a monofunctionalized polymer also competes effectively with addition of a first enophile to an unfunctionalized polymer leading to polyfunctional systems.

An alternative to the thermal ene and chloro processes is Koch carbonylation as described in CA-A-2110871, wherein the polymer is reacted with carbon monoxide and water, alcohol or thiol in the presence of an acid catalyst to form a carboxylic acid, carboxylic ester or carboxylic thiol ester at the site of olefinic unsaturation in the polymer. Because the double bond is consumed in the Koch reaction, monofunctionalized polymers with saturated backbones can be obtained from polymers having only one olefinic bond. On the other hand, the Koch reaction typically results in attachment of the carboxylic group to the more hindered side of the double bond, so that the resulting functionalized polymer can have a substantial proportion of neo substituted carboxylic groups. These neocarboxylic groups tend to be chemically stable and difficult to react with nucleophilic compounds including polyamines.

WO-A-95/21904 describes the preparation of carboxylic acids and esters useful as fuel or lubricant additives by reacting polymers having at least 30 carbon atoms and at least one double bond with carbon monoxide and water or alcohol in the presence a Group 8 to 10 metal or metal compound, but does not disclose the preparation of carboxylic amides.

EP-A-148592 describes the preparation of carboxylic esters from polymers containing residual carbon-carbon double bonds using carbon monoxide and alcohol in the presence of a protonic acid and as catalyst (a) at least one of the metals palladium, rhodium, ruthenium, iridium in elemental or compound form, and (b) a copper compound, both in the presence and absence of oxygen. It is disclosed that the carboxylic ester groups can be further reacted, if desired, with for example amines. The conversion and selectivity of the process cannot be determined from the data in the '592 document, but WO-A-95/21904 discloses that the repetition of the experiments described therein result in a conversion to desired products of less than 10%.

It is clear from the foregoing discussion that the need exists for improved processes for preparing carboxylic amide-containing polymers for dispersant applications. More particularly, processes are needed for the facile production of carboxylic amide-containing polymers from polyamines and hydrocarbon polymers, the carboxylic amide-containing polymer substantially to wholly composed of saturated polymer chains containing one amide group.

SUMMARY OF THE INVENTION

The present invention is a process for producing a saturated polymer monosubstituted with a carboxylic amide useful as a lubricating oil additive, which comprises reacting a monounsaturated hydrocarbon polymer with carbon monoxide and a polyamine containing at least two amino groups at least one of which is a reactive amino group, in the presence of a catalyst comprising at least one member selected from the group consisting of the transition metals of Group 8 to 10 and the metal compounds thereof. Particular embodiments of the process include the process wherein:

the polyamine comprises a member selected from the group consisting of an ethylene polyamine containing from about 3 to 12 nitrogen atoms per molecule and a mixture of ethylene polyamines containing an average of from about 3 to 10 nitrogen atoms per molecule;

the hydrocarbon polymer comprises at least one member selected from the group consisting of polyisobutylene and polybutene;

the hydrocarbon polymer comprises a member selected from the group consisting of an α-olefin homopolymer, an α-olefin copolymer, an ethylene α-olefin copolymer, and mixtures thereof;

the hydrocarbon polymer has an average of from about 8 to 33 branches per 100 total carbon atoms;

the hydrocarbon polymer has a number average molecular weight of at least about 700;

the catalyst is selected from the group consisting of cobalt, palladium, rhodium, iridium, and compounds thereof;

the catalyst is selected from the group consisting of cobalt and cobalt compounds, and the process is further characterized by being conducted in the presence of a nitrogen-containing base;

the catalyst is selected from the group consisting of rhodium, iridium and metal compounds thereof, and the process is further characterized by being conducted in the presence of a iodine-containing compound; or the process further comprises the step of separating the saturated, monosubstituted polymer from the catalyst.

The present invention includes the product obtained by the foregoing process or by any of its particular embodiments, and includes lubricating oil compositions containing any of these products or prepared by blending a base oil and any of these products.

The present invention also includes a process for producing a carboxylic amide-containing polymer useful as a lubricating oil additive, which process comprises reacting (A) a polyamine containing at least two amino groups at least one of which is a reactive amino group and (B) a monofunctionalized, saturated hydrocarbon polymer containing a carboxylic acid or carboxylic ester functional group, wherein the monofunctionalized hydrocarbon polymer is obtained by reacting a starting monounsaturated hydrocarbon polymer with carbon monoxide and water or an alcohol in the presence of a catalyst comprising at least one member selected from the group consisting of the transition metals of Group 8 to 10 and the metal compounds thereof. Particular embodiments of this process include the process wherein:

the polyamine comprises a member selected from the group consisting of an ethylene polyamine containing from about 3 to 12 nitrogen atoms per molecule and a mixture of ethylene polyamines containing an average of from about 3 to 10 nitrogen atoms per molecule;

the hydrocarbon polymer comprises at least one member selected from the group consisting of polyisobutylene and polybutene;

the starting hydrocarbon polymer comprises a member selected from the group consisting of an α-olefin homopolymer, an α-olefin copolymer, an ethylene α-olefin copolymer, and mixtures thereof;

the starting hydrocarbon polymer has an average of from about 8 to 33 branches per 100 total carbon atoms;

the starting hydrocarbon polymer has a number average molecular weight of at least about 700; or the monofunctionalized hydrocarbon polymer comprises carboxylic aryl ester monofunctionalized hydrocarbon polymer.

The product obtained by the foregoing process or by any of the particular embodiments thereof and the lubricating oil compositions containing any of these products or prepared by blending a base oil and any of these products are also part of the present invention.

The processes of the invention provide facile routes for producing carboxylic amide-containing polymers in good yields. The resulting saturated, monosubstituted products are useful as additives (e.g., dispersants and detergents) in lubricating oils and in fuels.

Still another aspect of the present invention is a composition comprising a polymeric amide of formula:

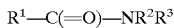

wherein $R^1$ is a saturated polymeric hydrocarbyl radical having a number average molecular weight of at least about 700; $R^2$ is H, $C_1$ to $C_{30}$ hydrocarbyl radical, or $C_1$ to $C_{30}$ substituted hydrocarbyl radical; $R^3$ is a $C_1$ to $C_{100}$ substituted hydrocarbyl radical containing at least one amino group or is —$R^4$—$NR^{2'}$—$C(=O)$—$R^{1'}$, wherein $R^{1'}$ is the same as $R^1$, $R^{2'}$ is the same as $R^2$, and $R^4$ is hydrocarbylene or substituted hydrocarbylene; or $R^2$ and $R^3$ combine to form a nitrogen-containing ring. Particular embodiments include the composition wherein:

from about 50 to 100 mole % of $R^1$ are radicals having the formula:

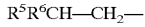

wherein $R^5$ is H or a $C_1$ to $C_{26}$ linear or branched chain alkyl radical and $R^6$ is the balance of the saturated polymeric hydrocarbyl radical;

$R^1$ is further characterized by having an average of from about 8 to 33 branches per 100 total carbon atoms; or $R^3$ is an alkylene polyamino radical.

The composition can be obtained by the preceding processes of the invention, and is useful as an additive in lubricating oils and fuels.

The present invention further includes a process for producing a carboxylic acid or ester functionalized hydrocarbon polymer which comprises reacting a monounsaturated hydrocarbon polymer in which at least about 75% of the polymer chains possess terminal unsaturation with carbon monoxide and water or an alcohol in the presence of a catalyst system comprising a compound of a transition metal of Group 8 to 10 and a promoter. The process provides for the production of acid or ester functionalized polymers with high rates of conversion.

The foregoing aspects and other aspects of the invention are more fully described below.

As used herein, the term "hydrocarbyl" refers to a radical having a carbon atom directly attached to the remainder of the molecule and consisting predominantly of carbon atoms and hydrogen atoms. Hydrocarbyl radicals include aliphatic hydrocarbyl groups (e.g., alkyl or alkenyl), alicyclic hydrocarbyl (e.g., cycloalkyl or cycloalkenyl), aromatic hydrocarbyl, aliphatic- and alicyclic-substituted aromatic, aromatic substituted aliphatic and alicyclic, and the like. The hydrocarbyl radical can contain non-hydrocarbon substituents (e.g., halo, hydroxy, alkoxy, etc.) or hetero groups in the chain or ring (e.g., —O—, —S— or —NH—), but only to the extent they do not alter the predomninantly hydrocarbon character of the radical.

The term "substituted hydrocarbyl" as used herein refers to a radical having a carbon atom directly attached to the remainder of the molecule, wherein the character of the radical is not predominantly hydrocarbon due to the presence of non-hydrocarbon substituents and/or hetero groups, such as those noted above in describing "hydrocarbyl".

DETAILED DESCRIPTION OF THE INVENTION

Hydrocarbon Polymers

The polymers which are useful for preparing the carboxylic amide-containing polymer of the invention are monounsaturated hydrocarbon polymers; i.e., hydrocarbon polymers composed of polymer chains containing one carbon-carbon double bond unsaturation. These monounsaturated hydrocarbon polymers may alternatively be referred to as monoethylenically unsaturated hydrocarbon polymers or monoolefinic hydrocarbon polymers. The monounsaturated hydrocarbon polymers can contain small amounts of either or both saturated polymer chains (i.e., chains having no olefinic bonds) and polyunsaturated polymer chains (chains having more than one olefinic bond). Generally, the saturated and polyunsaturated components will each represent no more than about 10 wt. % (e.g., from about 0.5 to 5 wt. % or from about 1 to 6 wt. %), typically no more than about 5 wt. % (e.g., from about 0.25 to 3 wt. %), and preferably no more than about 2.5 wt. % (e.g., from about 0.1 to 1 wt. %) of the monounsaturated hydrocarbon polymer.

Useful polymers in the present invention include polyalkenes including homopolymers, copolymers (which term is used interchangeably with interpolymers) and mixtures thereof. Homopolymers and copolymers include those derived from polymerizable olefin monomers of 2 to about 28 carbon atoms; more typically 2 to about 6 carbon atoms.

The polymer unsaturation can be terminal or internal. Terminal unsaturation is the unsaturation provided by the last monomer unit located in the polymer. The unsaturation can be located anywhere in this terminal monomer unit. Terminal olefinic groups include vinylidene unsaturation (also referred to in the art as ethenylidene unsaturation), $R^aR^bC=CH_2$; trisubstituted olefin unsaturation, $R^aR^bC=CR^cH$; vinyl unsaturation (also referred to as ethenyl unsaturation), $R^aHC=CH_2$; vinylene unsaturation (also referred to as 1,2-disubstituted terminal unsaturation), $R^aHC=CHR^b$; and tetra-substituted terminal unsaturation, $R^aR^bC=CR^cR^d$. In the case of vinyl unsaturation, $R^a$ is a saturated polymeric hydrocarbyl group. In the other cases, either $R^a$ or $R^b$ is a saturated polymeric hydrocarbyl group, and the remaining groups are non-polymeric hydrocarbyl groups, such as $C_1$ to $C_{26}$ linear or branched chain alkyl groups. The percentage of polymer chains in the polymer exhibiting terminal vinylidene, vinyl, vinylene, etc. unsaturation may be determined by FTIR spectroscopic analysis, titration, proton NMR, or carbon-13 NMR.

The hydrocarbon polymer has a number average molecular weight of at least about 500, and typically at least about 700. Low molecular weight polymers, also referred to herein as dispersant range molecular weight polymers, are polymers having $\overline{M}_n$ of from about 500 to 20,000 (e.g., from about 700 to 20,000 and from about 1,000 to 20,000), typically from about 700 to 15,000 (e.g., from about 1,000 to 15,000), more typically from about 1,000 to 10,000 (e.g., from about 1,500 to 10,000 or from about 2,000 to 8,000). In a preferred embodiment, the polymer has a number average molecular weight in a range of from about 700 to 5,000 (e.g., from about 1,000 to 4,000). The number average molecular weights can be determined by vapor phase osmometry or by gel permeation chromatography ("GPC"). Low molecular weight polymers are useful as backbones for lubricating oil dispersant additives. Low molecular weight polymers, particularly polymers having number average molecular weights of from about 500 to 2,500, are also useful in forming detergent additives for use in fuels.

Medium molecular weight polymers have $\overline{M}_n$'s ranging from about 20,000 to 200,000 (e.g., from about 25,000 to 100,000 or from about 25,000 to 80,000), and are useful, for example, as viscosity index improvers in lubricating oil compositions and are useful as the backbones for multifunctional viscosity index improvers. The medium $\overline{M}_n$ can be determined by membrane osmometry.

The values of the ratio $\overline{M}_w/\overline{M}_n$, referred to as molecular weight distribution ("MWD"), are not critical. However, a minimum $\overline{M}_w/\overline{M}_n$ value of about 1.1 to 2.0 is especially suitable, and a typical range is from about 1.1 to 5 (e.g., from about 1.1 to 3).

The hydrocarbon polymers can have branching along the backbone, wherein the branches are hydrocarbyl groups, typically linear or branched alkyl groups (e.g., $C_1$ to $C_{26}$ alkyl groups) or mixtures thereof. Suitable for use in the present invention are hydrocarbon polymers characterized by having an average of from about 8 to 33 branches (e.g., from about 8 to 33 alkyl side chains wherein alkyl is selected from methyl, ethyl, propyl and mixtures thereof) per 100 carbon atoms in the polymer. Also suitable are hydrocarbon polymers having an average of at least about 10 branches (e.g., from about 10 to 33 branches) per 100 carbon atoms of polymer. Especially suitable are the hydrocarbon polymers of the preceding sentence, wherein the branches are alkyl branches, particularly alkyl branches selected from methyl, ethyl, propyl, butyl and mixtures thereof. The degree of chain branching in the polymer can be determined by proton NMR or carbon-13 NMR.

Suitable polymers include homopolymers and copolymers of ethylene and α-olefins made using organo metallic coordination compound catalysts such as Ziegler-Natta catalysts. One class of suitable hydrocarbon polymers are those polymerized from monomer(s) in the presence of a metallocene catalyst system, such as the ethylene α-olefin copolymers described in U.S. Pat. No. 5,017,299. Another useful class of hydrocarbon polymers are those prepared by polymerizing the monomer(s) in the presence of a late-transitionmetal catalyst system, such as the polymers described in copending U.S. Ser. No. 663,468, filed Jun. 17, 1996, entitled "Polymers Derived from Olefins Useful as Lubricant and Fuel Oil Additives, Processes for Preparation of Such Polymers and Additives and Use Thereof". The use of these catalyst systems is discussed more fully below.

The olefin monomers are preferably polymerizable terminal olefins; that is, olefins characterized by the presence in their structure of the group —CR*=CH$_2$, where R* is H or a hydrocarbon group. However, polymerizable internal olefin monomers can also be used to form the polyalkenes. When internal olefin monomers are employed, they normally will be employed with terminal olefins to produce polyalkenes which are interpolymers.

As the term is used herein, "hydrocarbon polymer" includes polymers (e.g., polyalkenes) which contain non-hydrocarbon substituents, such as lower alkoxy (lower=1 to 7 carbon atoms); lower alkyl mercapto, hydroxy, mercapto, and carbonyl, wherein the non-hydrocarbon moieties do not substantially interfere with the processes for preparing the carboxylic amide-containing polymers of the present invention. Such substituents typically contribute not more than about 10 wt. % of the total weight of the hydrocarbon polymer (e.g., polyalkene).

The polyalkenes can include aromatic groups and cycloaliphatic groups such as would be obtained from polymerizable cyclic olefins or cycloaliphatic substituted-polymerizable acrylic olefins, but the polyalkenes typically employed are free from aromatic and cycloaliphatic groups and, in any event, contain only one carbon-carbon double bond (i.e., are substantially to wholly composed of polymer chains containing one carbon-carbon double bond).

Specific examples of terminal and internal olefin monomers which can be used to prepare the polyalkenes include ethylene, propylene, butene-1, butene-2, isobutene, pentene-1, and the like; propylene-dimer, -trimer, -tetramer and the like; diisobutylene, isobutylene trimer, and the like. Specific examples of polyalkenes include polypropylenes, isobutene homopolymers (i.e., polyisobutylenes), copolymers of isobutene with butene-1 and/or butene-2 (i.e., polybutenes), ethylene-propylene copolymers, ethylene-butene copolymers, propylene-butene copolymers, styrene-isobutene copolymers, and the like. A useful source of polyalkenes are the polybutenes obtained by polymerization of C$_4$ refinery streams having a butene content of from about 35 to 75% by weight, and an isobutene content of from about 30 to 60% by weight, in the presence of a Lewis acid catalyst such as aluminum trichloride or boron trifluoride.

Also useful are the high molecular weight poly-n-butenes described in WO-A-94/13714. A preferred source of monomer for making poly-n-butenes is petroleum feed streams such as Raffinate II. These feedstocks are disclosed in the art such as in U.S. Pat. No. 4,952,739.

Suitable polymers include polymers comprising monomer units derived from at least one of ethylene and α-olefins of formula H$_2$C=CHR$^e$ wherein R$^e$ is straight chain or branched chain alkyl radical comprising 1 to 26 carbon atoms. Preferably R$^e$ in the above formula is an alkyl of from 1 to 8 carbon atoms and more preferably is an alkyl of from 1 to 2 carbon atoms. Therefore, useful monomers in this invention include ethylene, propylene, butene-1, pentene-1, 4-methylpentene-1, hexene-1, octene-1, decene-1 and so forth, and mixtures thereof (e.g. mixtures of ethylene and propylene, ethylene and butene-1, propylene and butene-1, ethylene and propylene and butene-1,and the like).

One class of suitable polymers are ethylene α-olefin copolymers; i.e., polymers of ethylene and at least one α-olefin of formula H$_2$C=CHR$^e$ wherein R$^e$ is as defined in the preceding paragraph, and wherein the polymer has a high degree of terminal vinylidene unsaturation. Especially suitable polymers of this type are copolymers of ethylene and propylene; of ethylene and butene-1; and of ethylene, propylene, and butene-1.

The molar ethylene content of the polymers employed is typically in the range of from about 20 to 80%, and especially from about 30 to 70%. When butene-1 is employed as comonomer with ethylene, the ethylene content of such copolymer is preferably from about 20 to 45 wt %, although higher or lower ethylene contents may be present. Particularly suitable ethylene-butene-1 copolymers are described in U.S. Pat. No. 5,498,809, the disclosure of which is incorporated by reference. A suitable method for making low molecular weight ethylene α-olefin copolymer is described in U.S. Ser. No. 257,398, filed Jun. 9, 1994, herein incorporated by reference.

The range of number average molecular weight of ethylene α-olefin polymer for use as precursors for dispersants is suitably from about 500 to 10,000; typically from about 1,000 to 8,000 (e.g. from about 1,500 to 5,000). The number average molecular weight range of from about 2,500 to 6,000 is especially suitable. A convenient method for such determination is GPC which additionally provides molecular weight distribution information. Such polymers generally possess an intrinsic viscosity (as measured in tetralin at 135° C.) of between 0.025 and 0.6 dl/g, preferably between 0.05 and 0.5 dl/g, most preferably between 0.075 and 0.4 dl/g.

The ethylene α-olefin polymers are further characterized in that the polymer chains possess terminal vinylidene-type unsaturation. Thus, one end of such polymers will be of the formula POLY-C(R$^f$)=CH$_2$ wherein R$^f$ is C$_1$ to C$_{26}$ alkyl, preferably C$_1$ to C$_8$ alkyl, and more preferably methyl or ethyl and wherein POLY represents the polymer chain. A minor amount of the polymer chains can contain terminal vinyl unsaturation, i.e. POLY-CH=CH$_2$, and a portion of the polymers can contain internal monounsaturation, e.g. POLY-CH=CH(R$^f$), wherein R$^f$ is as defined above.

The ethylene α-olefin polymer comprises polymer chains, at least about 30% of which possess terminal vinylidene unsaturation. Typically at least about 50%, preferably at least about 60%, and more preferably at least about 75% (e.g. from about 75 to 98%), of such polymer chains exhibit terminal vinylidene unsaturation.

Another class of suitable polymers are α-olefin polymers; i.e., α-olefin homopolymers of an α-olefin of formula H$_2$C=CHR$^e$ and α-olefin copolymers of at least two α-olefins of formula H$_2$C=CHR$^e$ wherein R$^e$ is as defined above, and wherein the polymer has a high degree of terminal vinylidene unsaturation. Especially suitable α-olefin monomers are butene-1 and propylene and preferred α-olefin polymers are polypropylene, polybutene-1 and butene-1-propylene copolymer (e.g., butene-1-propylene copolymers having from about 5 to 40 mole % propylene). These α-olefin polymers comprise polymer chains wherein at least about 30%, typically at least about 50%, preferably at least about 60%, and more preferably at least about 75% (e.g., from about 75 to 98%) of the chains possess terminal vinylidene unsaturation.

The foregoing ethylene α-olefin polymers and the α-olefin polymers can be prepared by polymerizing monomer mixtures comprising the corresponding monomers (e.g., ethylene with one or more α-olefins) in the presence of a metallocene catalyst system comprising at least one metallocene (e.g., a cyclopentadienyl-transition metal compound)

and an activator, e.g. alumoxane compound. The comonomer content can be controlled through selection of the metallocene catalyst component and by controlling the relative amounts of the monomers. Illustrative of the processes which may be employed to make the polymers are those described in U.S. Pat. No. 4,668,834, U.S. Pat. No. 4,704,491, U.S. Pat. No. 5,017,299, EP-A-128046, EP-A-129368, and WO-A-87/03887.

Still another class of suitable polymers are the monounsaturated olefinic hydrocarbon polymers derived from at least one olefinic monomer selected from the group consisting of (a) ethylene, (b) one or more α-olefins, and mixtures of (a) and (b), wherein the polymer has a high degree of terminal vinyl and/or vinylene unsaturation. Particularly suitable α-olefins are those of formula $H_2C=CHR^e$ wherein $R^e$ is as earlier defined. These polymers typically have at least about 30% (e.g., from about 30 to 95%), preferably at least about 50% (e.g., from about 50 to 90%), more preferably at least about 75% (e.g., from about 75 to 90%), still more preferably at least about 80% (e.g., from about 80 to 95%), and most preferably at least about 90% (e.g., from about 90 to 98%) of the polymer chains terminated at one end by a vinyl group or by a vinylene group. In addition, the polymers typically have vinylidene groups terminating no more than about 15% (e.g., from about 0 to 15%) of the chains. Chains with trisubstituted olefinic groups can also be present in minor amounts; e.g., no more than about 15% (e.g., from about 0 to 15%) of the chains have trisubstituted unsaturation.

In one embodiment, the monounsaturated olefinic hydrocarbon polymers described in the preceding paragraph are further characterized by having an average of at least about 10 branches (e.g., from about 10 to 33 branches) per 100 carbon atoms in the polymer. In a further aspect, at least about 50% (e.g., at least about 75%) of the branches are methyl and/or ethyl branches. In another further aspect, at least about 50% of the branches are methyl and/or ethyl branches and at least about 80% of the branches are $C_1$–$C_4$ alkyl branches. In still another aspect, at least about 75% of the branches are methyl and/or ethyl branches and at least about 85% of the branches are $C_1$–$C_4$ alkyl branches.

The foregoing monounsaturated olefinic hydrocarbon polymers can be prepared by polymerizing the olefinic monomers in the presence of a late-transition-metal catalyst system. The catalyst comprises a late-transition metal compound of formula $LMZ_q$ wherein M is a Group 9, 10, or 11 metal, preferably a $d^6$, $d^8$ or $d^{10}$ metal, most preferably $d^8$ (wherein "Group" refers to the identified group of the Periodic Table of Elements, comprehensively presented in "Advanced Inorganic Chemistry," F. A. Cotton, G. Wilkinson, Fifth Edition, 1988, John Wiley & Sons);

L is a bidentate ligand that stabilizes a square planar geometry and charge balances the oxidation state of $MZ_q$;

each Z is, independently, a hydride radical, a hydrocarbyl radical, a substituted hydrocarbyl radical, a halocarbyl radical, a substituted halocarbyl radical, and hydrocarbyl- and halocarbyl-substituted organometalloid radicals; or two Z's are joined and bound to the metal atom to form a metallacycle ring containing from about 3 to 20 carbon atoms; or one or more Z can be a neutral donor ligand, e.g., an olefin, diolefin, or aryne ligand; and q=0, 1, 2, or 3; when Lewis-acid activators, such as methylalumoxane or aluminum alkyls or alkylaluminum halides, capable of donating a Z ligand as just described to the transition metal component, are used, one or more Z may additionally be independently selected from the group consisting of a halogen, alkoxide, aryloxide, amide, phosphide or other univalent anionic ligand or two successive Z's can also be joined to form an anionic chelating ligand, or one or more neutral non-hyrocarbyl atom containing donor ligands; e.g., phosphine, amine, nitrile or CO ligand.

The late-transition-metal catalyst compounds are activated for coordination polymerization by an activator. Suitable activators (also referred to in the art as co-catalysts) include alumoxane compounds such as those employed as activators with metallocenes and ionizing, anion pre-cursor compounds that abstract one Z so as to ionize the transition metal center into a cation and provide a counterbalancing compatible, non-coordinating anion, as well as organoaluminum compounds and aluminum halides.

The foregoing late-transition-metal compounds and activators and processes for polymerizing ethylene and α-olefins using late-transition-metal catalyst systems to obtain the above-described monounsaturated olefinic hydrocarbon polymers are described in detail in U.S. Ser. No. 663,468, filed Jun. 17, 1996, the disclosure of which is herein incorporated by reference.

Functionalized Hydrocarbon Polymer

The carboxylic amide-containing polymer of the invention can be prepared by condensing a polyamine with a monofunctionalized, saturated hydrocarbon polymer containing a carboxylic acid or a carboxylic ester functional group. The monofunctionalized, saturated hydrocarbon polymer can be obtained by reacting a monounsaturated hydrocarbon polymer (as described above) with carbon monoxide and water or an alcohol in the presence of a catalyst comprising at least one member selected from the group consisting of the Group 8 to Group 10 transition metals and the metal compounds thereof. In the reaction, a carboxylic acid functional group or a carboxylic ester functional group is respectively incorporated in the hydrocarbon polymer using water or alcohol, accompanied by saturation of the double bond.

Metals or metal compounds of Groups 8 to 10 of the periodic table are catalysts in the functionalization process. The catalysts can be used as heterogeneous or homogeneous catalysts, but are typically homogeneous. Suitable metal compounds include the halides (e.g., chlorides), acetates, and nitrates of the metals. The metals can themselves be employed. Especially suitable catalysts are cobalt, palladium, rhodium, iridium and their compounds. Rhodium and cobalt catalysts are preferred.

Suitable metal compounds include the metal carbonyl compounds, such as those selected from the group consisting of iron, cobalt, palladium, rhodium, ruthenium, iridium and osmium. In one aspect, the catalysts consist of transition metal carbonyl hydrides. Some of the carbonyl ligands can be replaced by other ligands such as trivalent phosphorus, trivalent nitrogen, and triorganoarsine and divalent sulfur compounds. Suitable trivalent phosphorus ligands include substituted and unsubstituted triaryl phosphines, diaryl alkyl phosphines, dialkyl aryl phosphines, and trialkyl phosphines.

The metal or metal compound catalyst is employed in an amount effective to achieve the desired conversion of the monoethylenically unsaturated hydrocarbon polymer to a saturated hydrocarbon polymer monofunctionalized with a carboxylic acid or carboxylic ester group. The transition metal concentration is typically in the range of from about 0.01 to 5 wt. % based on the polymer. Optimum concentrations will depend primarily on the metal employed. Cobalt concentrations typically range from about 0.1 to 5 wt. %. Rhodium concentrations typically range from about 0.01 to 0.1 wt. %. Other factors determining the optimum catalyst concentration include the concentration and type of unsaturation (e.g., terminal v. internal) and the desired degree of conversion. For complete conversion of hydrocarbon polymers containing a substantial proportion of internal olefins, a higher catalyst concentration is needed.

The functionalization reaction can optionally be conducted in the presence of a catalyst promoter. Nitrogen-containing bases are suitable, and tertiary aromatic amines including pyridine and alkylpyridines (e.g., picoline) are particularly suitable catalyst promoters, particularly for cobalt catalysts. Halide promoters such as $I_2$, HI, alkyl iodide (e.g., methyl iodide and ethyl iodide) and HCl are also suitable, particularly for rhodium catalysts. The nitrogen bases and halides can be used in any amount effective for promoting the functionalization reaction. When employed with cobalt catalysts, the tertiary aromatic amine is typically present in an amount ranging from about 0.1 to 10 moles per mole of catalytically active metal. When employed with rhodium catalysts, halide promoters are typically present in an amount ranging from about 1 to 20 halogen atoms per rhodium atom.

Carbon monoxide is present in a molar excess in the reaction, and is typically present in an amount of at least about one mole per mole of polymer. The ratio is adjusted by controlling the carbon monoxide partial pressure in the reaction zone. A typical range of carbon monoxide partial pressure in the reactor is from about 6895 to 34,475 kPa gauge (from about 1000 to 5000 psig), but higher or lower pressures can be used. The carbon monoxide, which can be provided by any suitable source, typically contains up to about 10 mole % hydrogen (i.e., from about 0 to 10 mole % hydrogen), wherein the balance (allowing for the presence of minor amounts of impurities) is CO.

The alcohols include primary or secondary aliphatic $C_1$–$C_{20}$ monoalcohols, including methanol, ethanol, isopropanol, n-propanol, n-butanol, sec-butanol, 2-ethylhexanol; 2-methyl-1-pentanol, $C_5$–$C_{13}$ oxo alcohols, polyhydric alcohols such as ethylene glycol, diethylene glycol, glycerol, pentaerythritol, dipentaerythritol, neopentyl glycol, trimethylol propane and the monomethyl ether of glycerol; aromatic $C_6$–$C_{10}$ alcohols such as phenol; and aralkyl $C_7$–$C_{12}$ alcohols such as benzyl alcohol.

Also suitable are phenols which have been substituted with at least one electron withdrawing substituent, wherein the substituted phenol has a pKa in water at 25° C. of less than about 12 (e.g., from about 5 to 12)and preferably less than about 10 (e.g., from about 6 to 10). The carboxylic ester functionalized hydrocarbon polymers resulting from use of these substituted phenols are typically more reactive with polyamines than the ester functionalized polymers obtained using the alcohols described in the preceding paragraph, which alcohols typically have higher pKa values. The pKa of the alcohol is a measure of how readily the resulting ester functionalized polymer will react with the polyamines. The use of this substituted phenol in the functionalization reaction can be particularly advantageous when the resulting functionalized polymer contains chemically stable functional groups, such as neo substituted functional groups (i.e., functional groups attached to tertiary carbon atoms in the hydrocarbon polymer), which may be difficult to react with polyamines, relative to functionalized polymers containing more reactive functional groups such as iso substituted functional groups (i.e., functional groups attached to a secondary carbon atom, such as —$CHR^gCOOR^h$ wherein $R^g$ is hydrocarbyl and $R^h$ is H or hydrocarbyl) and normal substituted functional groups (i.e., groups attached to a primary carbon atom, such as —$CH_2COOR^h$).

The substituted phenols include those represented by the formula:

wherein X, each of which is the same or different, is an electron withdrawing group; T, each of which is the same or different, is a non-electron withdrawing group (e.g., electron donating); m and p are integers from 0 to 5. Preferably, m is from 1 to 5, and more preferably 1 to 3. Preferably, p is from 0 to 2, and more preferably 0 to 1. X is preferably selected from a halogen (especially F or Cl), $CF_3$, CN, and $NO_2$. T is preferably selected from alkyl, especially $C_1$ to $C_6$ alkyl, and most especially methyl or ethyl.

The halophenols are an especially suitable class of substituted phenols. Exemplary halophenols include 2-, 3- and 4-chlorophenol; 2-, 3- and 4-fluorophenol, 2,4-dichlorophenol, and 2-chloro-4-methylphenol.

The amount of water or alcohol employed in the functionalization reaction is at least one mole per mole of polymer, but the water or alcohol is typically employed in a molar excess, typically from about 1.1 to 50 (e.g., from about 2 to 40), and preferably from about 1.2 to 10 (e.g., from about 1.5 to 5) moles per mole of polymer.

A solvent can be employed, provided that it remains inert under the applied reaction conditions. Especially suitable are solvents with the appropriate polarity to form a single phase containing the polymer, catalyst, and water or alcohol. Alternatively, the solvent can form a second phase with the polymer. Solvents suitable for forming a single phase with water or alcohol include oxygenated hydrocarbons such as acetone, ethers (e.g., ethyl ether or tetrahydrofuran), and organic acids (e.g., acetic acid). Solvents capable of forming a second liquid phase include aliphatic and cycloaliphatic hydrocarbons (e.g., hexane, octane and cyclohexane), aromatic hydrocarbons (e.g., benzene, toluene, and xylene) and halogenated aliphatic (e.g., dichloromethane, chloroform, and 1,2-dichloroethane) and aromatic hydrocarbons (e.g., chlorobenzene and bromobenzene). The solvent is typically used in an amount ranging from about 5 to 95 wt. % based on the total charge to the reaction zone.

The reaction can be carried out at a temperature ranging from about 20° to 300° C., more typically from about 25° to 250° C. (e.g., from about 50° to 200° C.). The reaction pressure is typically in the range from about 100 to 30,000 kPa (from about 1 to 300 bar) absolute. The reaction time is in the range of from about 4 to 100 hours (e.g., from about 10 to 48 hours), and typically from about 5 to 50 hours (e.g., from about 10 to 40 hours). To carry out the reaction, a mixture of the hydrocarbon polymer, water or alcohol, catalyst, optionally a catalyst promoter, and optionally solvent can be charged to the reaction zone, which is subsequently pressurized with carbon monoxide and heated to reaction temperature. The selected reaction pressure is maintained during the reaction by periodic addition of carbon monoxide. Alternatively, the catalyst and optional catalyst promoter can be charged separately to the reaction zone either before or after charging of the other components of the reaction mixture (i.e., polymer, water or alcohol, and the optional solvent) which themselves can be added all together, or separately or in any subcombination and in any convenient order.

The reaction can be conducted in a batch or a continuous mode.

An aspect of the present invention is the acid or ester functionalization process as heretofore described in which a monounsaturated hydrocarbon polymer having a high terminal double bond content is employed. More particularly, the process comprises reacting a monounsaturated hydrocarbon polymer wherein at least about 75% of the polymer chains possess terminal unsaturation with carbon monoxide and water or an alcohol in the presence of a catalyst system comprising (i) a catalyst selected from the group consisting of the transition metals of Group 8 to 10 and the metal compounds thereof and (ii) a promoter. The process employing such hydrocarbon polymers results in high conversions; i.e., at least about 60% conversion and typically at least about 70% conversion. Conversions of at least about 80% or at least about 90% can be achieved, including conversions in the range of from about 90 to 95% or from about 95 to 100%. The percent conversion can be determined by comparing the number of olefin groups per total number of aliphatic carbon atoms in the polymer before reaction (obtained by carbon-13 NMR) with the number of functional groups and olefin groups per total number of aliphatic carbon atoms in the polymer product (also obtained by carbon-13 NMR). These conversions are achievable using milder reaction conditions and/or shorter reaction times, as compared to the like functionalization of analogous polymers containing a low (e.g., less than about 50%) terminal double bond content. Especially suitable are hydrocarbon polymers in which at least about 80% (e.g., from about 80 to 95%) or at least about 90% (e.g. from about 95 to 99%) or even 100% of the polymer chains possess terminal unsaturation. In a further aspect of this process, at least about 90% (e.g., from about 95 to 100%) of the terminal double bonds in these hydrocarbon polymers are terminal vinylidene bonds.

The functionalized hydrocarbon polymer product can be recovered by any of a variety of methods available in the art. The catalyst can be removed by such known techniques as washing the product with water or with aqueous alkali or acid, distilling or stripping the catalyst from the product (e.g., stripping a hydridocobalt tetracarbonyl catalyst in the presence of a stabilizing mixture of carbon monoxide and $H_2$ at a temperature in the range from room temperature to 100° C.), oxidizing the catalyst to form a salt and then extracting the salt in aqueous solution, and stripping the product with a hydrogen-containing gas to reduce and thereby deposit the catalyst metal on the packing or walls of a recovery zone. An especially suitable technique for use in removing cobalt catalysts is the so-called "cobalt flash" technique described in U.S. Pat. No. 4,625,067, in which the product is contacted with a stream of stripping gas such as synthesis gas to entrain volatile Co compounds wherein the stripping is done in the presence of water or aqueous acid to dissolve Co not entrained at the stripping temperature and pressure employed. Of course, the selected technique must be operated under conditions which avoid or minimize decomposition or other chemical modification of the desired polymer product. The choice of such operating conditions is within the capability of the person of ordinary skill in the art.

Removal of solvents can be effected by distillation or by inert gas stripping with or without a partial vacuum (e.g., stripping with nitrogen gas at elevated temperature).

The functionalized hydrocarbon polymer produced by the above process is monofunctionalized and saturated; i.e., the functionalized polymer is composed of saturated polymer chains containing one carboxylic acid or one carboxylic ester group per chain. It is to be understood, however, that the functionalized polymer can contain small amounts (e.g., no more than about 10, no more than about 5, no more than about 3, or no more than about 1 wt. %) of polymer chains having more than one functional group. For example, in the event the starting monounsaturated hydrocarbon polymer contains a small amount of polyunsaturated chains as heretofore described, the functionalized polymer can contain a correspondingly small amount of polymer chains having more than one carboxylic acid or ester functional group.

As used herein, the term "saturated" means the substantial absence of aliphatic and cycloaliphatic carbon-carbon unsaturation in the functionalized polymer as determined by proton NMR or carbon-13 NMR. Thus, a sample of functionalized polymer which has been separated from the unfunctionalized polymer upon completion of the functionalization reaction will have no observable carbon-13 NMR signal due to olefinic carbon-carbon double bonds. Such a separation can be performed using chromatographic or other techniques known in the art. Alternatively, an unseparated sample of reaction product having Y % conversion of hydrocarbon polymer will have a carbon-13 NMR signal corresponding to an average of (100−Y)/100 double bonds per polymer chain.

In a preferred embodiment, the functionalized polymer is further characterized by having a low content of neo substituted functional groups; i.e., the functionalized polymer has no more than about 40 mole % (e.g., from about 0 to 35 mole %), typically no more than about 30 mole % (e.g., from about 1 to 25 mole % or from about 5 to 25 mole %), and preferably no more than about 15 mole % (e.g., no more than about 10 mole % or from about 0 to 15 mole %) neo functional groups, and is thus also characterized by having a correspondingly high content of iso functional groups and/or normal functional groups. In another preferred embodiment, the functionalized hydrocarbon polymer has at least about 50 mole % (e.g., from about 50 to 100 mole %) normal functional groups, preferably in combination with no more than about 40 mole % or no more than about 25 mole % (e.g., from about 1 to 25 mole %) or no more than about 10 mole % (e.g., from about 1 to 10 mole %) neo functional groups. The degree of neo, iso and normal substitution in the functionalized polymer can be determined by carbon-13 NMR.

Polyamines

The polyamines employed in preparing the carboxylic amide-containing polymer of the invention contain at least two amino groups at least one of which is a reactive amino group and mixtures of such polyamines. A reactive amino group is defined herein as a primary or secondary amino group which will react in accordance with the processes described below for preparing the carboxylic amide-containing polymer of the invention. The polyamine can optionally contain other reactive or polar groups, provided they do not interfere with these preparation processes. The polyamine can be a hydrocarbyl polyamine or a substituted hydrocarbyl polyamine containing substituent groups such as hydroxy, alkoxy, nitriles and the like. A suitable polyamine is an alkylene polyamine (e.g., ethylene polyamine) having from about 2 to 12 (e.g., 2 to 9), typically from about 3 to 12 (e.g., 3 to 9 or 3 to 10) nitrogen atoms per molecule, or mixtures of such alkylene polyamines (e.g., ethylene polyamines) having an average number of nitrogen atoms per molecule corresponding to the foregoing ranges. Exemplary alkylene polyamines include tetraethylene pentamine ("TEPA"), pentaethylene hexamine ("PEHA"), N-(2-aminoethyl)piperazine, di-(1,2-propylene)triamine, and di-(1,3-propylenetriamine). Among the useful alkylene polyamines are commercial mixtures of ethylene polyamines averaging from 5 to 7 nitrogen atoms per molecule available under the tradename E-100 (Dow Chemical) and HPA-X (Union Carbide).

In one embodiment, the alkylene polyamine is a heavy alkylene polyamine which is defined herein as an alkylene polyamine having at least about 7 nitrogen atoms per molecule or mixtures of alkylene polyamines (e.g., a mixture of higher oligomers of alkylene polyamines) having an average of at least about 7 nitrogen atoms per molecule. Exemplary heavy alkylene polyamines include the linear and branched isomers of hexaethylene heptamine, heptaethylene octamine, and hexa-(1,2-propylene)heptamine. A preferred heavy polyamine is a mixture of ethylene polyamines containing essentially no TEPA, at most small amounts of PEHA, and the balance oligomers with more than 6 nitrogens and more branching than conventional commercial polyamine mixtures such as the E-100 and HPA-X mixtures noted in the preceding paragraph.

A useful heavy alkylene polyamine composition is commercially available from Dow Chemical under the tradename HA-2. HA-2 is a mixture of higher boiling ethylene polyamine oligomers and is prepared by distilling out all the lower boiling ethylene polyamine oligomers (light ends) up to and including TEPA. The TEPA content is less than 1 wt. %. Only a small amount of PEHA, less than 25 wt. %, usually 5–15 wt. %, remains in the mixture. The balance is higher nitrogen content oligomers with a great degree of branching. The heavy polyamine preferably contains essentially no oxygen. Typical analysis of HA-2 gives primary nitrogen values of 7.8 milliequivalents (meq) (e.g., 7.7 to 7.8) of primary amine per gram of polyamine. This calculates to be about an equivalent weight (EW) of 128 grams per equivalent (g/eq).

The total nitrogen content is from about 32 to 33 wt. %. In comparison, conventional commercial polyamine mixtures such as E-100 and HPA-X typically have from about 8.7–8.9 meq of primary amine per gram and a nitrogen content of from about 33 to 34 wt. %.

Another suitable polyamine is a one-armed amine, which is defined herein as an amine containing an average of one primary amino group and one or more secondary or tertiary amino groups per molecule. The one-armed amine preferably contains one primary amino group and 1 to 10 secondary or tertiary amino groups. Mixtures of such one-armed amines are also suitable. Exemplary one-armed amines are dimethylamino-propylaminopropylamine and polypropylenetetramine with one end substituted with a tallow group and having approximately one primary amine per molecule. Suitable one-armed amines are further described in WO-A-95/35329.

Other suitable polyamines include polyoxyalkylene polyamines such as those described in U.S. Pat. No. 5,229,022; amidoamines and thioamidoamines as described in U.S. Pat. No. 4,857,217 and U.S. Pat. No. 4,956,107; and aminocyclohexane derivatives as described in U.S. Pat. No. 5,296,560 and U.S. Pat. No. 5,213,698. All of the foregoing US patents are incorporated herein by reference.

Among the suitable polyamines are the aliphatic saturated polyamines which can be represented by the formula (II):

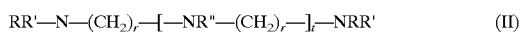

(II)

wherein R and R' are independently selected from the group consisting of H, $C_1$ to $C_{25}$ straight or branched chain alkyl radicals, $C_1$ to $C_{12}$ alkoxy $C_2$ to $C_6$ alkylene radicals, $C_2$ to $C_{12}$ hydroxy amino alkylene radicals, and $C_1$ to $C_{12}$ alkylamino $C_2$ to $C_6$ alkylene radicals; and wherein R" is independently selected from the group consisting of H, $C_1$ to $C_{26}$ straight or branched chain alkyl radicals, $C_1$ to $C_{12}$ alkoxy $C_2$ to $C_6$ alkylene radicals, $C_2$ to $C_{12}$ hydroxy amino alkylene radicals, and $C_1$ to $C_{12}$ alkylamino $C_2$ to $C_6$ alkylene radicals, and moieties of formula

(III)

wherein R' is as defined above; r and r' are the same or a different number of from 2 to 6; t and t' are the same or a different number of from 0 to 10, provided that the sum of t and t' is not greater than 15; and wherein R, R', R", r, r', t, and t' are selected such that at least one primary or secondary amino group is present.

The polyamine is reacted (i.e., condensed) with the functionalized hydrocarbon polymer under conditions effective to amidate at least a portion of the carboxylic acid or carboxylic ester functional groups in the functionalized polymer. The reaction may be carried out at any temperature up to the decomposition of the reactants and products, but is typically conducted at temperatures of from about 50° to 250° C. (e.g., from about 100° to 250° C.). The reaction time can vary widely depending upon the choice and amount of polyamine and functionalized polymer to be reacted, the desired degree of conversion, reaction temperature, and the like, but are typically in the range of from about 1 to 15 hours (e.g., from about 1 to 10 hours). The progress of the reaction can be followed by monitoring the formation and/or removal of the water or alcohol byproduct. Normally the reaction is run until no more water or alcohol is formed. The relative proportions of the polyamine and functionalized polymer can vary over a considerable range depending in part upon the choice of reactants and the desired degree of conversion. Typically, however, the polyamine is employed in an amount of at least one equivalent (e.g., from about 1 to 10 equivalents) of reactive amino groups per equivalent of carboxylic acid or ester functional groups. (Note: When the reactive amino groups in the polyamine reactant consist wholly of primary amino groups or a combination of primary and secondary amino groups, the number of equivalents employed is typically based only on the more reactive primary amino groups.) The use of a stoichiometric to excess amount of equivalents of reactive amino is desirable in that it permits 100% conversion of the functionalized polymer to amide-containing polymer.

In cases where the polyamine is volatile with respect to the amide-containing polymer product (and thus easy to separate from the polymeric amide by such techniques as inert gas stripping or distillation, with or without vacuum), the use of a considerable excess of polyamine (e.g., from about 2 to 20 equivalents of reactive amino groups per equivalent of functional groups) may be desirable to reduce reaction time and/or increase the degree of conversion. However, when the polyamine is not volatile with respect to the amide product, as may be the case when a heavy polyamine is the reactant, it is often desirable to use either a stoichiometric amount or a slight excess of polyamine (e.g., from about 1.1 to 1.4 equivalents per equivalent of functional groups) to avoid a final product containing significant amounts of unreacted polyamine or high levels of basic nitrogen (e.g., high levels of unreacted primary amino groups) or both. The presence of unreacted polyamine in the final product represents a loss of valuable reactant. Furthermore, the unreacted polyamine and/or high basic nitrogen levels can be detrimental in certain applications such as dispersant applications involving contact with elastomer seals.

Hydroamidation

Another aspect of the present invention is the preparation of the carboxylic amide-containing polymer of the invention by hydroamidating (i.e., carbonylating and amidating in a single step) a monounsaturated hydrocarbon polymer. More particularly, the hydroamidation process produces a saturated polymer monosubstituted with a carboxylic amide by reacting a monounsaturated hydrocarbon polymer with carbon monoxide and a polyamine containing at least two amino groups, at least one of which is a reactive amino group, in the presence of a catalyst comprising at least one member selected from the group consisting of the transition metals of Group 8 to 10 and the metal compounds thereof.

The catalysts, process conditions, solvents, and recovery methods employed in the hydroamidation process are similar to those described above for preparing carboxylic acid or ester monofunctionalized, saturated hydrocarbon polymers. The hydrocarbon polymers and polyamine reactants suitable for use in the hydroamidation process are the same as those already described. An advantage of the hydroamidation process over the earlier described amine condensation process is the direct formation of the carboxylic amide group in a single step, thereby eliminating recovery and/or handling of an intermediate product (i.e., the acid or ester functionalized hydrocarbon polymer) and eliminating the use of water or alcohol as a reactant.

The amide-containing polymers of the present invention obtained by the foregoing processes (i.e., the product obtained by the condensation reaction of a polyamine with a carboxylic acid or ester monofunctionalized hydrocarbon polymer and the product obtained by hydroamidation) are characterized by having one carboxylic amide directly attached to the hydrocarbon polymer and by being saturated (i.e., the polymer is composed of saturated polymer chains containing one carboxylic amide substituent per chain), wherein "saturated" means a substantial absence of aliphatic and cycloaliphatic carbon-carbon unsaturation, as earlier defined in terms of carbon-13 NMR. It is to be understood, however, that the amide-containing polymer can contain a small amount (e.g., no more than about 10, no more than about 5, no more than about 3, or no more than about 1 wt. %) of polymer chains having more than one carboxylic amide substituent. For example, in the event the starting monounsaturated hydrocarbon polymer contains a small amount of polyunsaturated chains as heretofore described, the amide-containing polymer polymer can contain a correspondingly small amount of polymer chains having more than one carboxylic amide substituent.

In a preferred embodiment, the amide-containing polymer is further characterized by having a low content of neo amides directly attached to the polymer; i.e., the amide-containing polymer has no more than about 40 mole % (e.g., from about 0 to 35 mole %), typically no more than about 30 mole % (e.g., from about 1 to 25 mole % or from about 5 to 25 mole %), and preferably no more than about 15 mole % (e.g., no more than about 10 mole % or from about 0 to 15 mole %) directly attached neo amide groups, and is thus also characterized by having a correspondingly high content of directly attached iso functional groups and/or normal functional groups. In another preferred embodiment, the amide-containing hydrocarbon polymer has at least about 50 mole % (e.g., from about 50 to 100 mole %) directly attached normal amide groups, preferably in combination with no more than about 40 mole % or no more than about 25 mole % (e.g., from about 1 to 25 mole %) or no more than about 10 mole % (e.g., from about 1 to 10 mole %) directly attached neo amide groups. The content of directly attached neo, iso and normal substitution in the functionalized polymer can be determined by carbon-13 NMR.

The present invention includes compositions comprising an amide-containing polymer of formula:

$$R^1—C(=O)—NR^2R^3 \quad (IV)$$

wherein $R^1$ is a saturated polymeric hydrocarbyl radical having a number average molecular weight of at least about 700; $R^2$ is H, $C_1$ to $C_{30}$ hydrocarbyl radical, or $C_1$ to $C_{30}$ substituted hydrocarbyl radical; $R^3$ is a $C_1$ to $C_{100}$ substituted hydrocarbyl radical containing at least one amino group or is $—R^4—NR^{2'}—C(=O)-R^{1'}$, wherein $R^{1'}$ is the same as $R^1$, $R^{2'}$ is the same as $R^2$, and $R^4$ is hydrocarbylene or substituted hydrocarbylene; or $R^2$ and $R^3$ combine to form a nitrogen-containing ring. A subset of the polymers represented by formula (IV) is further characterized by having no more than about 40 mole % of the $—C(=O)NR^2R^3$ groups attached to a tertiary carbon atom of $R^1$. Another subset of the polymers of formula (IV) is further characterized by having from about 50 to 100 mole % of $R^1$ being radicals of formula:

$$R^5R^6CH—CH_2— \quad (V)$$

wherein $R^5$ is H or a $C_1$ to $C_{26}$ linear or branched chain alkyl radical and $R^6$ is the balance of the saturated polymeric hydrocarbyl radical.

Illustrative of the amide-containing polymers represented by formula (IV) are polymers in which $R^2$ is H and $R^3$ is $—CH_2CH_2NH_2$, $—CH_2CH_2CH_2CH_2CH_2CH_2NH_2$, $—CH_2CH_2CH_2CH_2CH_2CH_2NH—C(=O)—R^{1'}$, $—CH_2CH_2NHCH_2CH_2NH_2$, $—CH_2CH_2NHCH_2CH_2NH—C(=O)—R^{1'}$, $—CH_2CH_2CH_2N(CH_3)_2$, and

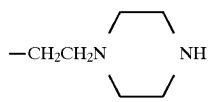

wherein $R^1$ is derived from a monounsaturated hydrocarbon polymer as earlier described and $R^{1'}$ is the same as $R^1$. Another example of the amide-containing polymers of formula (IV) is where R2 and R3 together form a piperazinyl ring

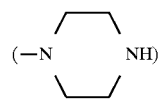

and $R^1$ is as defined in the preceding sentence.

Post-treatment

The amide-containing hydrocarbon polymer of the present invention can be post-treated. The processes used for post-treating are analogous to the post-treating processes used for conventional dispersants and viscosity modifiers. Accordingly, the same reaction conditions, ratio of reactants and the like can be used. Thus, the amidoamine product can be post-treated with such reagents as aldehydes, inorganic acids, carboxylic acids, dicarboxylic acid anhydrides, hydrocarbyl substituted succinic anhydrides, caprolactone, cyclic ethylene carbonates, Mannich base condensates formed from an aldehyde and either diphenylamine or benzotriazole, nitriles, epoxides, boron compounds, phosphorus compounds and the like.

In one embodiment, the product can be borated by post-treating the product with a borating agent to obtain a borated product containing at least about 0.1 weight percent of boron based on the total weight of the borated product. The borated product can contain up to about 10 wt. % boron (e.g., 3 to 10 wt. %) but preferably has from about 0.05 to 2 wt. %, e.g., 0.05 to 0.7 wt. % boron. Suitable borating agents include boron halides, (e.g. boron trifluoride, boron tribromide, boron trichloride), boron acids, and simple esters of the boron acids (e.g., trialkyl borates containing 1 to 8 carbon alkyl groups such as methyl, ethyl, n-octyl, iso-octyl, 2-ethylhexyl, etc.).

The boration reaction is typically carried out by adding from about 0.05 to 5 wt. %, e.g., 1 to 3 wt. % (based on the weight of the product) of the borating agent, and heating with stirring at from about 90° to 250° C., preferably 135° to 290° C. (e.g. 140° to 170° C.), for from about 1 to 10 hrs. followed by nitrogen stripping in said temperature ranges. The borating agent is preferably boric acid which is most usually added as a slurry to the reaction mixture.

A suitable low sediment process involves borating with a particulate boric acid having a particle size distribution characterized by a $\phi$ value of not greater than about 450. The process is described in U.S. Pat. No. 5,430,105.

In another embodiment, the product can be post-treated by reaction with a phosphorus-containing agent to introduce phosphorus or phosphorus-containing moieties into the product. Suitable phosphorus-containing agents include phosphorus acids, phosphorus oxides, phosphorus sulfides, phosphorus esters and the like. Suitable inorganic phosphorus compounds include phosphoric acid, phosphorous acid, phosphorus pentoxide, and phosphorus pentasulfide. Suitable organic phosphorus compounds include mono-, di- and trihydrocarbyl phosphates, the hydrocarbylpyrophosphates, and their partial or total sulfur analogs wherein the hydrocarbyl group(s) contain up to about 30 carbon atoms each. Illustrative post-treatments employing phosphorus compounds are described in U.S. Pat. Nos. 3,184,411, 3,342,735, 3,403,102, 3,502,677, 3,511,780, 3,513,093, 4,615,826, and 4,648,980, and in GB-A-1153161 and 2140811.

In still another embodiment, the product can be post-treated by reaction with a low molecular weight dicarboxylic acid acylating agent such as maleic anhydride, maleic acid, fumaric acid, succinic acid, alkenyl or alkyl substituted succinic acids or anhydrides (in which the alkyl or alkenyl substituent has from 1 to about 24 carbon atoms), and the like. The acylating agent is typically reacted with the amidoamine product at temperatures in the range of from about 80° to 180° C. for a time ranging from about 0.1 to 10 hours, optionally in the presence of an inert solvent.

In a further embodiment, the product can be post-treated by reaction with a strong inorganic acid, such as with a mineral acid selected from sulfuric, nitric and hydrochloric acid at a temperature of from about 93° to 204° C., as described in U.S. Pat. No. 4,889,646.

Compositions

The amide-containing polymers of the present invention possess properties (e.g., good dispersancy and detergency) which make them useful as additives in fuels and in lubricating oils. The additives of the invention are used by incorporation into the lubricating oils and fuels. Incorporation may be done in any convenient way and typically involves dissolution or dispersion of the additives into the oil or fuel in a dispersant or detergent-effective amount. The blending into the fuel or oil can occur at room or elevated temperature. Alternatively, the additives can be blended with a suitable oil-soluble solvent/diluent (such as benzene, xylene, toluene, lubricating base oils and petroleum distillates, including the various normally liquid petroleum fuels noted below) to form a concentrate, and then the concentrate can be blended with a lubricating oil or fuel to obtain the final formulation. Such additive concentrates will typically contain on an active ingredient (AI) basis from about 10 to 80 weight percent, typically from about 20 to 60 wt. %, and preferably from about 40 to 50 wt. % additive, and typically from about 40 to 80 wt. %, preferably from about 40 to 60 wt. % base oil (or fuel) based on concentrate weight.

When the additives of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to 0.5 wt. %, and preferably 0.005 to 0.15 wt. %, based on the total weight of the composition, will usually be employed.

Fuel compositions of this invention can contain other conventional additives in addition to the additive of the invention. These can include anti-knock agents, cetane improvers, metal deactivators, deposit modifiers/preventors, and anti-oxidants.

The additives of the present invention find their primary utility in lubricating oil compositions which employ a base oil in which the additives are dissolved or dispersed therein. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additives of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Natural oils include animal oils and vegetable oils, liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, and chlorinated polybutylenes). Other suitable synthetic oils include alkylene oxide polymers, interpolymers and derivatives thereof where the terminal hydroxyl groups have been modified by esterification, etherification, and the like; esters of dicarboxylic acids; polyol esters made from $C_5$ to $C_{12}$ monocarboxylic acids and polyols such as neopentyl glycol; esters made from polyalkylene glycols such as polyethylene and/or polypropylene glycol; and silicon-based oils such as the polyalkyl-polyaryl-, polyalkoxy-, or polyaryloxysiloxane oils and silicate oils.

The additives of the present invention may be mixed with other types of conventional additives, each selected to perform at least one desired function. Among the other additives which may be in the lubricating oil formulation are metal containing detergent/inhibitors, viscosity modifiers, and anti-wear agents. The metal detergent/inhibitors are generally basic or overbased alkali or alkaline earth metal salts or mixtures thereof (e.g. mixtures of Ca and Mg salts) of one or more organic acids (e.g., sulfonates, naphthenates, phenates and the like). Viscosity modifiers are generally hydrocarbon polymers or polyesters, optionally derivatized to impart dispersancy or some other property, having number average molecular weights of from $10^3$ to $10^6$. The anti-wear agents are typically oil-soluble zinc dihydrocarbyl dithiophosphates.

Other additives which may be employed in the formulation are antioxidants, corrosion inhibitors, pour depressants, friction modifiers, foam inhibitors, demulsifiers, flow improvers, and seal swell control agents. Conventional dispersants can also be employed in addition to the additives of the invention.

These other additives are typically blended into the base oil in amounts which are effective to provide their normal attendant function. Whether used alone or in combination with these other additives, the additives of the present invention are generally employed (e.g., as a dispersant additive) in an amount of from about 0.01 to 20 wt. %, typically in an amount of from about 0.1 to 10 wt. %, and especially in an amount of from about 0.1 to 6 wt. %, based upon the total weight of the composition.

Additive concentrates comprising concentrated solutions of the additives of this invention together with one or more of these other additives can be prepared by adding the additives to the base oil, wherein the subject additives of this invention are typically added in concentrate amounts as described above. The collective amounts of the subject additive together with other additives can range from about 2.5 to 90 wt. %, typically from about 15 to 75 wt. %, and preferably from about 25 to 60 wt. % additives with base oil as the balance. The concentrate will typically be formulated to contain the additives in the amounts necessary to provide the desired concentration in the final formulation when the concentrate is combined with a predetermined amount of base lubricant.

Unless otherwise indicated, all of the weight percents expressed herein are based upon the active ingredient content of the additive and/or based upon the total weight of any additive package or formulation which will be the sum of the AI weight of each additive plus the weight of the total oil or diluent.

The active ingredient contents expressed herein reflect the AI content added to (i.e., incorporated into) the foregoing compositions and concentrates. This value can differ from the actual amount of additive present in the compositions and concentrates as a result of additive interactions and/or environmental exposures (e.g., to air) during blending, storage and/or use.

EXAMPLES

The following examples illustrate, but do not limit the scope of, the present invention.

Example 1

A solution of 100 grams of a monounsaturated ethylene-butene-1 copolymer ($\overline{M}_n$=2000; 50 wt. % butene content) in 100 ml of glacial acetic acid is charged to a one-liter, Hastelloy C stirred autoclave reactor, followed by addition of 0.30 grams of dicarbonyl rhodium acetylacetonate, 5 ml of 47 wt. % aqueous hydrogen iodide, and 8 ml of water. The reactor is then pressurized with carbon monoxide to a total pressure of 6,895 kPa gauge (1,000 psig) and is heated to and maintained at a temperature of 185° C. for five hours, all the while maintaining the pressure by periodic addition of carbon monoxide. After five hours, the reactor and its contents are cooled to room temperature and excess carbon monoxide is vented. The reaction mixture containing ethylene-butene-1 copolymer monofunctionalized with carboxylic acid groups is washed twice with water to remove acetic acid and the rhodium components.

Example 2

To a one-gallon stirred autoclave is charged 1000 grams of monounsaturated polypropylene ($\overline{M}_n$=1,500), 20 grams of dicobalt octacarbonyl, 175 grams of 3-picoline, 600 grams of methanol and 1000 grams of toluene. The autoclave is then pressurized with carbon monoxide to 25,238 kPa gauge (250 atm.) and its contents is heated to 190° C. The autoclave is maintained with stirring at this temperature and pressure (by periodic addition of carbon monoxide) for 24 hours, after which it is cooled to room temperature and the carbon monoxide is vented. The dicobalt component is removed from the reaction mixture by treating the mixture with air and acetic acid and then washing with 5 wt. % aqueous acetic acid solution. The washed product is then distilled to remove residual picoline and toluene to give a methyl ester monofunctionalized polypropylene.

Example 3

The methyl ester functionalized polypropylene of Example 2 is dissolved in an equal amount by weight of S150N mineral oil and to the polymer solution is added a mixture of ethylene polyamines having the average composition corresponding to tetraethylene pentamine and containing about 32.6 wt. % nitrogen, the ethylene polyamines being present in the amount of 1.2 equivalents of primary amino groups per equivalent of methyl ester functional groups. The mixture is heated to 180° C. under nitrogen while stirring for 6 hours. The mixture is then stripped with nitrogen at 140° C. for 1 hour to remove residual methanol byproduct and any unreacted polyamine.

Example 4

To a one-liter stirred autoclave flushed with nitrogen is charged 100 grams of a monounsaturated ethylene-butene-1 copolymer ($\overline{M}_n$=2000; 50 wt. % butene content), 10 grams of Dow heavy polyamine HA-2, 20 grams of pyridine, and 2 grams of dicobalt octacarbonyl. The autoclave is then pressurized with carbon monoxide to 25,238 kPa gauge (250 atm.) and its contents is heated to 200° C. The autoclave is maintained with stirring at this temperature and pressure (by periodic addition of carbon monoxide) for 24 hours, after which it is cooled to room temperature and the carbon monoxide is vented. The reaction product mixture is washed with 5 wt. % aqueous acetic acid solution. The washed product is then stripped with nitrogen under vacuum to remove any residual byproduct and reagent volatiles.

What is claimed is:

1. A process for producing a saturated polymer monosubstituted with a carboxylic amide useful as a lubricating oil additive, which comprises reacting a monounsaturated hydrocarbon polymer with carbon monoxide and a polyamine containing at least two amino groups at least one of which is a reactive amino group, in the presence of a catalyst comprising at least one member selected from the group consisting of the transition metals of Group 8 to 10 and the metal compounds thereof.

2. The process according to claim 1, wherein the polyamine comprises a member selected from the group consisting of an ethylene polyamine containing from about 3 to 12 nitrogen atoms per molecule and a mixture of ethylene polyamines containing an average of from about 3 to 10 nitrogen atoms per molecule.

3. The process according to claim 1, wherein the hydrocarbon polymer comprises at least one member selected from the group consisting of polyisobutylene and polybutene.

4. The process according to claim 1, wherein the hydrocarbon polymer comprises a member selected from the group consisting of an α-olefin homopolymer, an α-olefin copolymer, an ethylene α-olefin copolymer, and mixtures thereof.

5. The process according to claim 1, wherein the hydrocarbon polymer has an average of from about 8 to 33 branches per 100 total carbon atoms.

6. The process according to claim 1, wherein the hydrocarbon polymer has a number average molecular weight of at least about 700.

7. The process according to claim 1, wherein the catalyst is selected from the group consisting of cobalt, palladium, rhodium, iridium, and compounds thereof.

8. The process according to claim 1, wherein the catalyst is selected from the group consisting of cobalt and cobalt compounds, and is further characterized by being conducted in the presence of a nitrogen-containing base.

9. The process according to claim 1, wherein the catalyst is selected from the group consisting of rhodium, iridium and metal compounds thereof, and is further characterized by being conducted in the presence of a iodine-containing compound.

10. The process according to claim 1, further comprising the step of separating the saturated, monosubstituted polymer from the catalyst.

11. A process for producing a carboxylic amide-containing polymer useful as a lubricating oil additive, which process comprises reacting (A) a polyamine containing at least two amino groups at least one of which is a reactive amino group and (B) a monofunctionalized, saturated hydrocarbon polymer containing a carboxylic acid or carboxylic ester functional group, wherein the monofunctionalized hydrocarbon polymer is obtained by reacting a starting monounsaturated hydrocarbon polymer with carbon monoxide and water or an alcohol in the presence of a catalyst comprising at least one member selected from the group consisting of the transition metals of Group 8 to 10 and the metal compounds thereof.

12. The process according to claim 11, wherein the polyamine comprises a member selected from the group consisting of an ethylene polyamine containing from about 3 to 12 nitrogen atoms per molecule and a mixture of ethylene polyamines containing an average of from about 3 to 10 nitrogen atoms per molecule.

13. The process according to claim 11, wherein the hydrocarbon polymer comprises at least one member selected from the group consisting of polyisobutylene and polybutene.

14. The process according to claim 11, wherein the starting hydrocarbon polymer comprises a member selected from the group consisting of an α-olefin homopolymer, an α-olefin copolymer, an ethylene α-olefin copolymer, and mixtures thereof.

15. The process according to claim 11, wherein the starting hydrocarbon polymer has an average of from about 8 to 33 branches per 100 total carbon atoms.

16. The process according to claim 11, wherein the starting hydrocarbon polymer has a number average molecular weight of at least about 700.

17. The process according to claim 11, wherein the monofunctionalized hydrocarbon polymer comprises carboxylic aryl ester monofunctionalized hydrocarbon polymer.

18. The process according to claim 11, wherein the catalyst is selected from the group consisting of cobalt, palladium, rhodium, iridium, and compounds thereof.

19. A composition comprising a polymeric amide of formula:

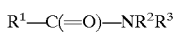

$$R^1\text{—}C(\text{=}O)\text{—}NR^2R^3$$

wherein $R^1$ is a saturated polymeric hydrocarbyl radical having a number average molecular weight of at least about 700; $R^2$ is H, $C_1$ to $C_{30}$ hydrocarbyl radical, or $C_1$ to $C_{30}$ substituted hydrocarbyl radical; $R^3$ is a $C_1$ to $C_{100}$ substituted hydrocarbyl radical containing at least one amino group or is —$R^4$—$NR^{2'}$—$C(=O)$—$R^{1'}$, wherein $R^{1'}$ is the same as $R^1$, $R^{2'}$ is the same as $R^2$, and $R^4$ is hydrocarbylene or substituted hydrocarbylene; or $R^2$ and $R^3$ combine to form a nitrogen-containing ring; and wherein no more than about 40 mole % of the —$C(=O)NR^2R^3$ groups are attached to a tertiary carbon atom of $R^1$.

20. The composition according to claim 19, wherein from about 50 to 100 mole % of $R^1$ are radicals having the formula:

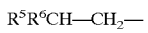

$$R^5R^6CH\text{—}CH_2\text{—}$$

wherein $R^5$ is H or a $C_1$ to $C_{26}$ linear or branched chain alkyl radical and $R^6$ is the balance of the saturated polymeric hydrocarbyl radical.

21. The composition according to claim 19, wherein $R^1$ is further characterized by having an average of from about 8 to 33 branches per 100 total carbon atoms.

22. The composition according to claim 19, wherein $R^3$ is an alkylene polyamino radical.

23. The process according to claim 11, wherein the carbon monoxide contains up to about 10 mole % hydrogen.

* * * * *